Nov. 23, 1937.  R. SARAZIN  2,099,965
METHOD OF RECORDING THE WORK PERFORMED BY WELDERS
Filed Oct. 20, 1933  2 Sheets-Sheet 1

| Times | Sunday | Monday | Tuesday | Wednesday | Thursday | Friday | Saturday |
|-------|--------|--------|---------|-----------|----------|--------|----------|
| 7 30  |        | 8320   | 8320    | 8451      | 8580     |        |          |
|       |        | 610    |         | 1070      | 1370     |        |          |
| 8     |        |        |         |           |          |        |          |
| 8 30  |        |        |         |           |          |        |          |
|       |        |        | 8360    |           |          |        |          |
| 9     |        |        | 930     |           |          |        |          |
| 9 30  |        |        |         |           |          |        |          |
|       |        |        |         | 8542      |          |        |          |
| 10    |        |        |         | 1140      |          |        |          |
| 10 30 |        |        |         |           |          |        |          |
| 11    |        |        |         |           |          |        |          |

R. Sarazin
INVENTOR

By: Marks & Clerk
Attys.

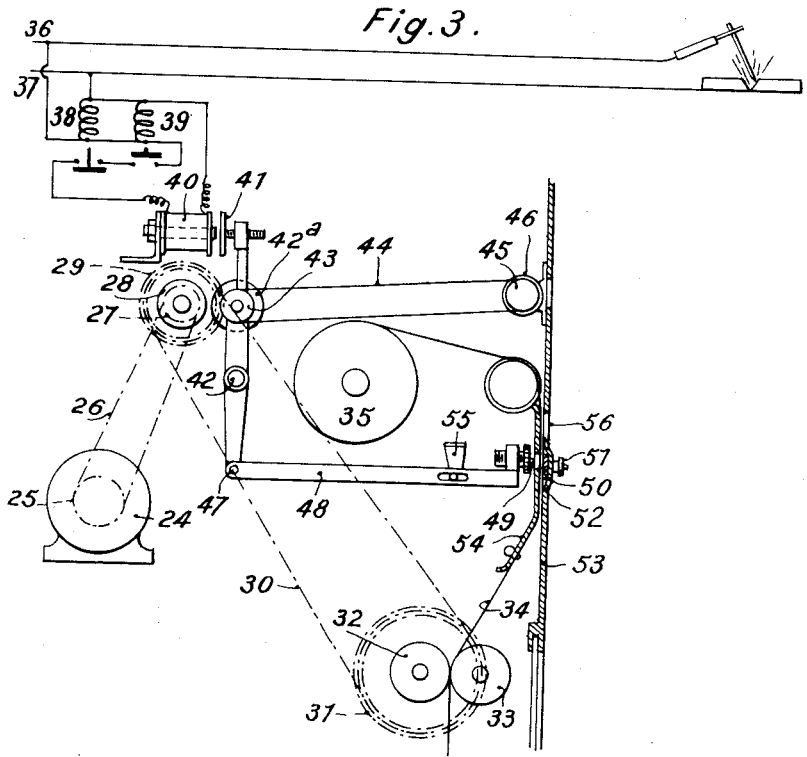

Patented Nov. 23, 1937

2,099,965

UNITED STATES PATENT OFFICE 2,099,965

METHOD OF RECORDING THE WORK PERFORMED BY WELDERS

Robert Sarazin, Neuilly-sur-Seine, France

Application October 20, 1933, Serial No. 694,475
In France October 22, 1932

3 Claims. (Cl. 234—36.5)

The welder's production is quite variable and depends, not only on his activity and his professional qualities, but also on the place of the weld, the thickness of the pieces to be welded, and on the kind of electrode employed.

It is evident that it is difficult to exert a control on the welder, with the usual means normally employed in the industry.

However, it is desirable to be able to pay the workmen according to their production. To do this work is estimated in terms of the time corresponding to actual welding.

For instance, in the arc welding field, and according to the efficiency of the welder, he will pass more or less time in the change of electrode, in hammering off the slag, or brushing the weld. Therefore it seems right to base his pay on the actual time passed on welding or rather on the ratio between the time actually spent in welding and the time spent in the shop.

In order to take into account the variation of this ratio and get the mean welding time, say for a week, I have thought of recording an elementary welding time corresponding to the fusion of each electrode and integrating the number of minutes corresponding to these successive fusions.

At the end of each period of control, for example at the end of each week, the man in charge of survey records the figures on the small register, this having totalized the effective time during which the operator has really welded; by computing the ratio of actual welding with the total time of presence, he obtains a result which serves for the making up of the payroll, with reference to the scale of prices established from work of the same kind.

For the purpose of ascertaining the effective time of the workman I make use of the arc voltage as being the best adapted to this purpose.

It is well known by welders that the striking voltage of the welding arc is generally chosen between 40 and 70 volts and under these circumstances the voltage existing during maintenance of the arc will lie between 15 and 35 volts. Any device for recording the time consumed in welding must therefore be operative when the voltage is from 15 to 35 volts and inoperative at all other times.

These different values depend principally on the nature of the feeding current or the quality of the electrode employed, and also on the arc length.

The controlling system which is the object of my patent, must integrate the elementary periods of time during which the voltage across the terminals of the arc, has been between 15 and 35 volts.

With respect to this, I have conceived an electric device actuated by relays of the kind used on automatic machines for arc welding which are well known by welding engineers, or otherwise a device consisting of two simple relays one established for closing an auxiliary circuit at 15 volts for instance, and another one to cut this same circuit when the feeding voltage rises over 35 volts.

The use of two relays of this kind is quite favourable since it is necessary to eliminate the time while the welder makes short-circuits with his electrode or while the workman loiters and does not weld (the no load voltage is in all cases higher than 35 volts).

The counting of all actual welding times avoids, practically, for the welder the possibility of any cheating regarding the results.

In arc welding practice, it is admitted that a conscientious workman can really weld during 50 to 60% of the time, the rest being employed in hammering off the slag, brushing the welds, changing of electrode, changing of work, loss of time, etc.

As a matter of fact, many workmen weld only from 25 to 35% of the time and therefore this control system permits the improvement of their production.

The apparatus of control are very simple and two realizations are explained hereunder, as an example.

Fig. 3 is a view similar to Fig. 1 but showing a modification suitable for multiple welding circuits.

Fig. 4 shows a diagram traced by the recording device of Fig. 3.

Figure 1 shows the type of individual apparatus, that is to say, controlling one operator only. One may see on the figure the two welding leads (1 and 2) one connected with the electrode holder (3) and the other to the work (4).

Figures 1, 2:
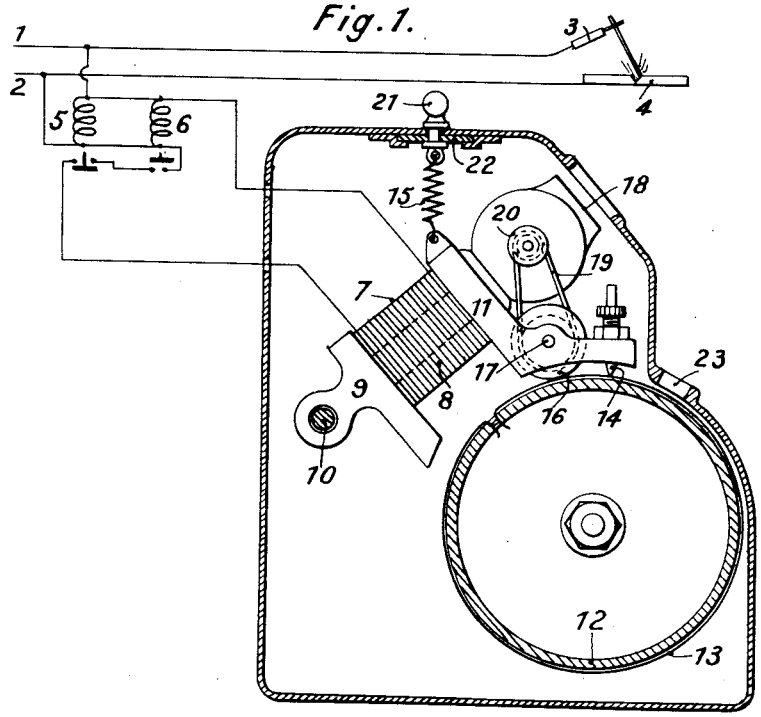
Fig. 1 is an end elevation of the device partly in section showing a part of the welding apparatus to which it is connected.
Fig. 2 shows a diagram traced by the recording device of Fig. 1.

Across the terminals of the welding circuit, the current is derived to feed the two relays (5 and 6). Each of these relays, of a well known type, bears a moving bridging piece which can close two contacts.

The relay (5) acts by closing the circuit, that is to say as soon as the voltage through its magnetic coil is higher than 15 volts. At this time, the bridging piece closes the two contacts. The relay (6) works by breaking the auxiliary circuit. This means that normally, during the welding operation, the bridging piece rests on the working contacts, the auxiliary circuit is closed and this working corresponds to all values of the voltage across the magnetizing coil of the relay inferior to 35 volts.

Notwithstanding these conditions one may see that the circuit of the coil (7) is closed by the two relays (5 and 6), for all the values of the arc voltage comprised between 15 and 35 volts.

For all the values inferior to 15 volts, that is to say those which are too small to sustain the welding arc, the circuit of the coil (7) is broken by the relay (5), the circuit of the coil (7) is also broken for all use of the voltage superior to 35 volts by relay (6).

Figure 1 gives a simple mechanical embodiment. One may see that coil (7) is mounted on a magnetic core (8) provided with a base (9), pivoted on an axle (10), and it bears also a carrier piece of soft iron or similar metal (11) that is provided with an extension projecting over a rotatably mounted drum (12). A sheet of paper is wound upon the drum (12).

The drum is rotated at constant speed by any suitable means.

The arrangement of the drum (12) is of the kind found on common recording apparatus It is clear from the drawings that the sheet of paper (13) will receive all the marks from the style (14) which may be a pencil lead or any marking device of known construction.

When the coil (7) is not magnetized, the spring (15) draws the carrier piece and the parts carried thereby away from the drum so that no printing may be traced. The apparatus thus described gives dots and dashes of a length corresponding to the duration of the established welding arc; in order to integrate those units of time, the apparatus is completed by a small register which keeps account of time units.

It has been said that the drum (12) was rotated at constant speed, for instance: it makes a complete turn in 8 or 9 hours. For operating the register I use a small roller (16) pivoted on axle (17) and mounted on the pole piece (11).

The roller 16 bears on the drum and transmits its motion to the small meter (18). The transmission may be obtained by a small belt, such as (19) and pulley (20), on the shaft of the meter.

As the small roller (16) will be in contact with the drum (12) only when the pencil 14 is also in contact with said drum, which is during the maintenance of the welding arc, motion will be transmitted to the register during such time, and such time only as the welding arc is maintained. The register thus records the total time of welding.

All welding operations are thus recorded in a very simple manner. The time corresponding to the fusion of an electrode is represented by a small dash and long intervals between each dash represent the dead times corresponding to the change of electrode, hammering of the slag, etc. and also to the loss of time by lazy operators.

Referring to Fig. 1, the complete mechanism of the coil (7) may be displaced along the axle (10), owing to the button (21) mounted in an oblong slot 21a of a sliding plate 22, and moving parallel to the axis 10, which button is pushed by the workman into different notches 22a formed in the upper plate which may be pushed by the foreman in the different notches of the sliding member (22) parallel to axle (10). Each notch corresponds through a series of operations or to a day of the week for instance, and the sheet of paper may be ruled transversely according to the schedule of a day's work.

On Figure 1, one may see an opening (23) which allows the welder to write by hand the observations concerning the kind of work, such as shop orders, or any other indication of that kind. At the same time, the welder can write under the shop order, the figure indicated by the time meter.

On Figure 2, one may see that on Monday the welder has started his work at 7:30 o'clock with the work No. 8320, at this moment the time meter indicated 610 minutes. He has worked all Monday and has continued the same work on Tuesday and finished it at 8:45 o'clock. The time meter indicated 930 minutes, therefore it can be seen at once that the time of execution of the piece No. 8320 is of 930 minutes less 610 minutes–320 minutes.

By examining the diagram of control the foreman or the engineer can verify at any moment or at the end of the week the time passed by the welder on each piece of work and it is easy for him to determine the number of minutes spent in welding during say, a week.

The ratio between actual welding time and the time passed in the shop will reveal the economic value of the workman better than could visual control which moreover it is practically impossible to obtain. It is therefore easier to pay the workman in a way appropriate to his production.

In big welding shops it is desirable to show on the controlling diagram all elementary operations executed in the shop simultaneously, so that the engineer by examining the diagram corresponding to a day, knows all the incidents of the day's work.

In the construction shown in Fig. 3 the clock motion is given by motor (24). The motion is transmitted to the apparatus by a pulley or pinion (25) and a belt or chain (26) which rotates the pulley or pinion (27).

On the same shaft of pulley (27) is mounted a drum (28) whose length depends upon the number of recording mechanisms. A pulley (29) on the same shaft as drum (28) rotates drum (32) by means of a chain (30) and a wheel (31) as clearly shown in Fig. 3. A roller (33) is mounted in close juxtaposition to drum (32), see Fig. 3.

The sheet of paper (34) is pulled from a roll (35) by the rollers (32 and 33) and the speed of displacement is constant. On each individual welding circuit are branched two connections (36 and 37) which feed the two relays (38 and 39); relay (38) closes its working contact for voltage higher than 15 volts, relay (39) opens its contact for a value higher than 35 volts. In these conditions the current is turned on in coil (40) for all voltages corresponding to the voltage of a stable welding arc.

On striking the arc in welding the voltage will at once fall to that of arc-maintenance (15–45 volts) whereupon the coil (40) will pull the contact (41) which is connected to a lever articulated around an axle (42). On its upper part, the lever carries a roller (42a) and the mechanism is adjusted in such a way that the attraction of the contact (41) makes the roller bear on the drum (28). The roller (42ᵃ) is then set in rotation and as it is provided with a small pulley (43), it transmits the rotation by a small belt (44) to a pulley (45) which is set on a shaft of the register (46).

The register (46) registers the number of units of time and shows at any moment the number of minutes of actual welding made by the workmen.

At its lower part, the lever carries an arm articulated at the end (47) with a small connecting rod (48) provided with some form of recording device such as (49). From the disposition of the mechanism, one may see that the recording device would write on the back of the paper, but I have arranged to have the paper pushed by the recording device against a sheet of soft graphite (50) backed by a spring controlled by a thumb-screw (51) and mounted in the slot (52) on the front plate (53) of the apparatus.

The sheet of paper slides against the plate (54). In order to ensure a good motion of the recording device 49 guiding means are provided consisting of a pin projecting from a port 55 supported on the frame of the machine and fitting slidably in a slot in the rod 48.

It may be seen that an opening (56) has been made in plate (53) to permit the workman to write indications concerning his work. The above described control systems are placed side by side with sufficient space between them, the size of the drum (28) and of the width of the sheet of paper being taken into consideration.

It appears that the motor (24) which determines the rotation of drum (28) and relay (31) should be sufficient to drive any number of individual control systems.

On examining Figure 4, one can see on the upper part the indications concerning different welders in the same shop. On the left it is apparent that the first operator has taken new work at about 9:30 o'clock. At this moment the shop number was 9560 and his register showed 710 minutes of welding. The dots and dashes represented by the interrupted line of the diagram show the fusion of electrodes.

A second operator, a little on the right, has taken a piece of work according to shop order No. 9280 at 9 o'clock and his register at that time marked 870 minutes and so on.

When these welders have finished their work, they write the new shop order of their new work and they also write the number of minutes registered by their own register. The difference between these figures, read under the register, gives the number of minutes of actual welding for the work whose shop order has been marked on the diagram.

Therefore, at a glance, and at the end of every period of work, for instance at the end of the day, the engineer is able to obtain a proper judgment of the welding shop production.

I claim:

1. An elapsed time recorder comprising a working circuit, a normally open branch circuit connected across said working circuit, means responsive to only a predetermined range of power utilization in said working circuit for closing said branch circuit, and elapsed time exhibiting means operatively responsive to closure of said branch circuit.

2. An elapsed time recorder comprising a working circuit, a normally open branch circuit connected across said working circuit, means responsive to a predetermined range of voltages across said working circuit for closing said branch circuit, and elapsed time exhibiting means operatively responsive to closure of said branch circuit.

3. An elapsed time recorder comprising a working circuit, a normally open branch circuit connected across said working circuit, means responsive to only a predetermined range of power utilization in said working circuit for closing said branch circuit, an electro-magnet energized by closure of said branch circuit and recording and registering means responsive to said electro-magnet when energized.

ROBERT SARAZIN.